United States Patent
Li et al.

(10) Patent No.: US 10,288,952 B2
(45) Date of Patent: May 14, 2019

(54) TOUCH PANEL, ARRAY SUBSTRATE, AND METHOD FOR FABRICATING THE SAME

(71) Applicant: Shenzhen China Star Optoelectronics Technology Co., Ltd., Shenzhen, Guangdong (CN)

(72) Inventors: Wenying Li, Guangdong (CN); Sikun Hao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 591 days.

(21) Appl. No.: 14/786,307

(22) PCT Filed: Sep. 25, 2015

(86) PCT No.: PCT/CN2015/090673
§ 371 (c)(1),
(2) Date: Oct. 22, 2015

(87) PCT Pub. No.: WO2017/045222
PCT Pub. Date: Mar. 23, 2017

(65) Prior Publication Data
US 2018/0120607 A1    May 3, 2018

(30) Foreign Application Priority Data
Sep. 16, 2015  (CN) .......................... 2015 1 0591375

(51) Int. Cl.
*G06F 3/044*    (2006.01)
*G02F 1/1333*   (2006.01)
(Continued)

(52) U.S. Cl.
CPC .......... *G02F 1/1343* (2013.01); *G02F 1/1333* (2013.01); *G02F 1/1362* (2013.01);
(Continued)

(58) Field of Classification Search
CPC .... G02F 1/1343; G02F 1/1362; G02F 1/1333; G06F 3/044; G06F 2203/04112; G06F 2203/04103
See application file for complete search history.

(56) References Cited

U.S. PATENT DOCUMENTS

| 9,318,514 B2 | 4/2016 | Kim et al. |
| 9,348,460 B2 | 5/2016 | Lee et al. |

(Continued)

FOREIGN PATENT DOCUMENTS

| CN | 103268876 A | 8/2013 |
| CN | 103293790 A | 9/2013 |

(Continued)

*Primary Examiner* — Srilakshmi K Kumar
*Assistant Examiner* — Brent D Castiaux
(74) *Attorney, Agent, or Firm* — Andrew C. Cheng

(57) ABSTRACT

The present invention proposes a touch panel, an array substrate, and method for fabricating for the same. The array substrate includes a pixel electrode layer and a touch electrode layer insulated against the pixel electrode layer. The touch electrode layer is arranged on one side of the pixel electrode layer facing a touch operational space. By using the present invention, sensitivity of the touch panel is upgraded.

5 Claims, 3 Drawing Sheets

(51) Int. Cl.
*G02F 1/1343* (2006.01)
*G02F 1/1362* (2006.01)

(52) U.S. Cl.
CPC .... *G06F 3/044* (2013.01); *G06F 2203/04103* (2013.01); *G06F 2203/04112* (2013.01)

(56) References Cited

U.S. PATENT DOCUMENTS

| | | |
|---|---|---|
| 2007/0210303 A1 | 9/2007 | Ikeda et al. |
| 2011/0050604 A1* | 3/2011 | Kwon ............... G06F 3/0412 345/173 |
| 2015/0103265 A1* | 4/2015 | Kim ............... G06F 3/0412 349/12 |
| 2015/0309634 A1 | 10/2015 | Lee et al. |
| 2017/0033127 A1 | 2/2017 | Zhao et al. |
| 2017/0200600 A1 | 7/2017 | He et al. |
| 2017/0277008 A1 | 9/2017 | Jiang et al. |

FOREIGN PATENT DOCUMENTS

| | | | |
|---|---|---|---|
| CN | 204557445 U | * | 8/2015 |
| CN | 204557445 U | | 8/2015 |
| CN | 104880871 A | | 9/2015 |
| KR | 1020150075512 A | | 7/2015 |
| KR | 20150103479 A | | 9/2015 |

* cited by examiner

TOUCH PANEL, ARRAY SUBSTRATE, AND METHOD FOR FABRICATING THE SAME

BACKGROUND OF THE INVENTION

1. Field of the Invention

The present invention relates to touch panel technology field, more particularly to a touch panel, an array substrate, and a method for fabricating the same.

2. Description of the Prior Art

Liquid crystal displays show vivid colors while keeping a low power consumption and flicker rate, and thus have become mainstream in displays, being widely applied in electronic devices such as mobile phones, cameras, computer screens, and televisions.

Touch panels are sturdy, durable, and space saving. They react fast and are easy to interact with. Via touch panel technology, users may operate electronic devices by simply touching an icon or a text on a touch screen. This direct way of human-machine interaction has brought revolutionized convenience to users who are not so good at conventional computer operation.

Nowadays many electronic devices have screens manufactured via both liquid crystal display technology and touch panel technology. These liquid crystal touch panels, born with advantages from both technologies, are a great market success. However, due to structural facts of conventional liquid crystal displays, conventional liquid crystal touch panels have their sensing electrodes, which realize the touch function, set under pixel electrodes of liquid crystal displays. This lays difficulty for sensing electrodes to sense user touch, and thus decreases sensitivity of touch panels.

SUMMARY OF THE INVENTION

The present invention provides a touch panel, an array substrate, and a method for fabricating the same, in order to increase sensitivity of user touch.

According to the present invention, an array substrate applied to a touch panel comprises a plurality of touch electrode lines insulated against one another, a pixel electrode layer, and a touch electrode layer insulated against the pixel electrode layer. The touch electrode layer is arranged on one side of the pixel electrode layer facing a touch operational space. The touch electrode layer comprises a plurality of self-capacitance touch electrodes insulated against one another. Each of the plurality of self-capacitance touch electrodes is connected to one of the plurality of touch electrode lines correspondingly, and the one of the plurality of touch electrode lines and a source-drain metallic layer driving a thin-film transistor (TFT) of the pixel electrode layer are not arranged on the same layer. The touch electrode layer is used as a common electrode layer of the array substrate as well.

Furthermore, each of the plurality of touch electrode lines and each of the plurality of self-capacitance touch electrodes correspondingly are arranged on different layers.

Furthermore, a first insulation layer and a second insulation layer are formed on one side of the pixel electrode layer facing the touch operational space successively, and the touch electrode layer is arranged on one side of the second insulation layer facing the touch operational space. The plurality of touch electrode lines are formed on one side of the first insulation layer facing the touch operational space. A plurality of first conducting holes are disposed on the second insulation layer, and at least some of the plurality of touch electrode lines are connected to the plurality of self-capacitance touch electrodes correspondingly via the first conducting hole, respectively.

Furthermore, the array substrate further comprises a third insulation layer, a source-drain metallic layer, a fourth insulation layer, a gate, a gate insulation layer, and an active layer, formed on one side of the pixel electrode layer backing on the touch operational space successively. A second conducting hole is arranged on the third insulation layer, and the pixel electrode layer is connected to the source-drain metallic layer via the second conducting hole.

According to the present invention, a touch panel comprises an array substrate. The array substrate comprises a pixel electrode layer and a touch electrode layer insulated against the pixel electrode layer. The touch electrode layer is arranged on one side of the pixel electrode layer facing a touch operational space.

Furthermore, the touch panel further comprises a plurality of touch electrode lines insulated against one another. The touch electrode layer comprise a plurality of self-capacitance touch electrodes insulated against one another, each of the plurality of self-capacitance touch electrodes is connected to one of the plurality of touch electrode lines correspondingly. The one of the plurality of touch electrode lines and a source-drain metallic layer driving a thin-film transistor (TFT) of the pixel electrode layer are not arranged on the same layer.

Furthermore, each of the plurality of touch electrode lines and each of the plurality of self-capacitance touch electrodes correspondingly are arranged on different layers.

Furthermore, a first insulation layer and a second insulation layer are formed on one side of the pixel electrode layer facing the touch operational space successively. The touch electrode layer is arranged on one side of the second insulation layer facing the touch operational space. The plurality of touch electrode lines are formed on one side of the first insulation layer facing the touch operational space. A plurality of first conducting holes are disposed on the second insulation layer, and at least some of the plurality of touch electrode lines are connected to the plurality of self-capacitance touch electrodes correspondingly via the first conducting hole, respectively.

Furthermore, the touch electrode layer is used as a common electrode layer of the array substrate as well.

Furthermore, the touch panel further comprises a third insulation layer, a source-drain metallic layer, a fourth insulation layer, a gate, a gate insulation layer, and an active layer, formed on one side of the pixel electrode layer backing on the touch operational space successively. A second conducting hole is arranged on the third insulation layer, and the pixel electrode layer is connected to the source-drain metallic layer via the second conducting hole.

According to the present invention, a method for fabricating an array substrate, comprises: providing a substrate; forming a pixel electrode layer on the substrate; forming a touch electrode layer on the pixel electrode layer so that the touch electrode layer is arranged on one side of the pixel electrode layer facing a touch operational space and that the pixel electrode layer is insulated against the touch electrode layer.

Furthermore, before the step of forming the touch electrode layer on the pixel electrode layer, some steps are needed, the method comprises: forming a plurality of touch electrode lines insulated against one another on the pixel electrode layer, insulating the plurality of touch electrode lines against the pixel electrode layer, and arranging the plurality of touch electrode lines and a source-drain metallic layer driving a thin-film transistor (TFT) of the pixel electrode layer on different layers. Steps of forming the touch electrode layer on the pixel electrode layer comprise: forming a plurality of self-capacitance touch electrodes insulated against one another on the pixel electrode layer, and connecting each of the plurality of self-capacitance touch electrodes to each of the plurality of touch electrode lines correspondingly.

Furthermore, each of the plurality of self-capacitance touch electrodes and each of the plurality of touch electrode lines correspondingly are arranged on different layers. Before the step of forming the plurality of touch electrode lines insulated against one another on the pixel electrode layer, the method comprises: forming a first insulation layer on the pixel electrode layer so that the first insulation layer is arranged on one side of the pixel electrode layer facing the touch operational space. The step of forming the plurality of touch electrode lines insulated against one another on the pixel electrode layer comprises: forming the plurality of touch electrode lines insulated against one another on the first insulation layer; forming a second insulation layer on the touch electrode line so that the second insulation layer is arranged on one side of the pixel electrode layer facing the touch operational space; and forming a plurality of first conducting holes on the second insulation layer. The step of forming the plurality of self-capacitance touch electrodes insulated against one another on the pixel electrode layer comprises: forming the plurality of self-capacitance touch electrodes insulated against one another on the second insulation layer, and connecting at least some of the plurality of touch electrode lines to the corresponding self-capacitance touch electrodes via the first conducting hole, respectively.

In contrast to prior art, on the array substrate of the present invention, the sensing electrode layer is set at the side which the pixel layer faces user touch, in order to bring the sensing electrode layer closer to user touch, enhance the sensing electrode layer to sense user touch, and thus increase sensitivity of the touch panel.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
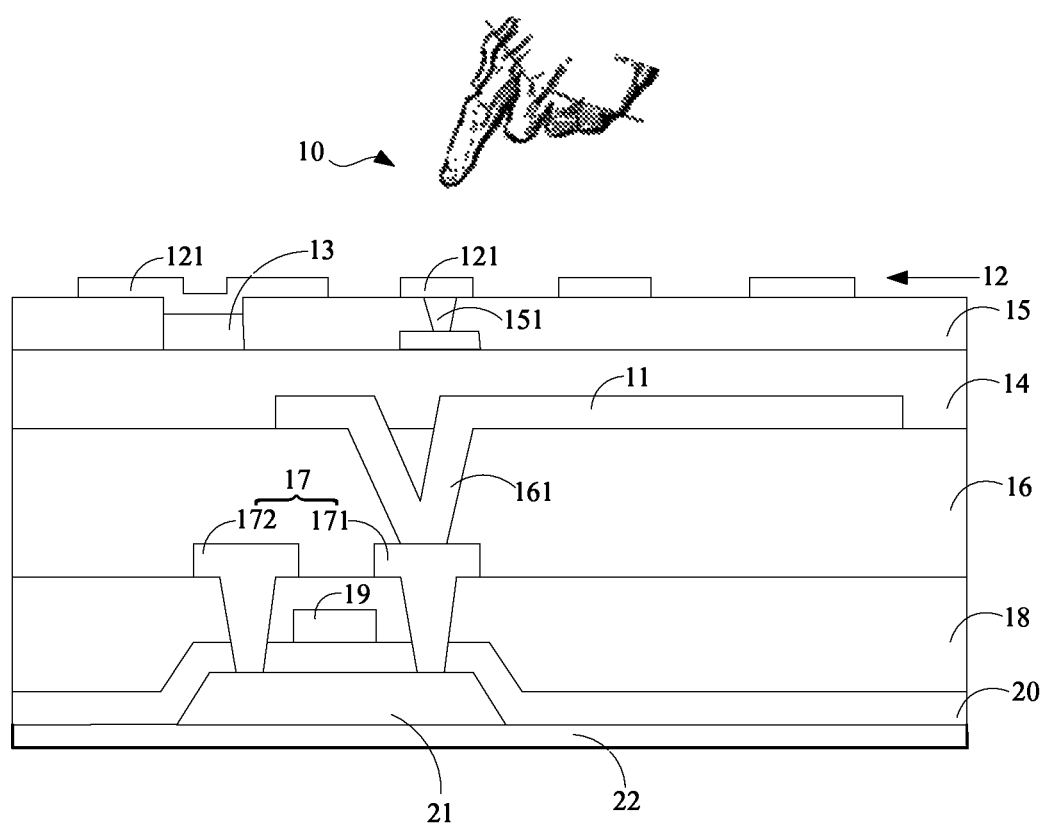
FIG. 1 is a cross sectional view of an array substrate applied in a touch panel according to a preferred embodiment of the present invention.
Figure 2:
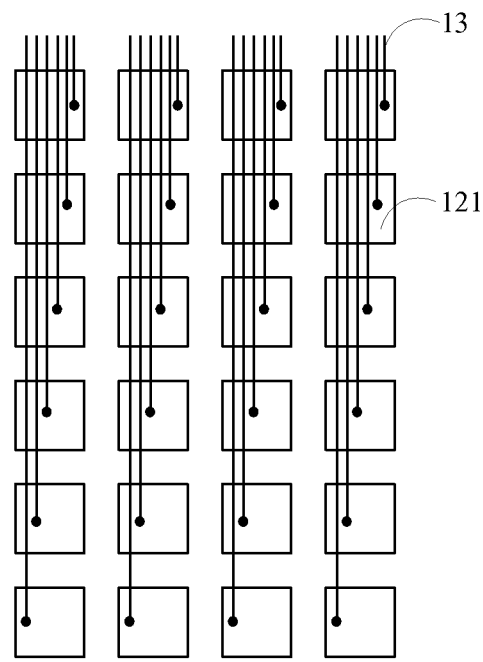
FIG. 2 is a top view of an array substrate applied in a touch panel according to a preferred embodiment of the present invention.

Please refer to FIG. 1 and FIG. 2. An array substrate used in a touch panel is proposed by one embodiment of the present invention. The array substrate comprises a pixel electrode layer 11 and a touch electrode layer 12. The pixel electrode layer 11 is insulated against the touch electrode layer 12.

The touch panel is a liquid crystal display (LCD) panel with the function of touch. The pixel electrode layer 11 is used for showing images of the LCD panel. The touch electrode layer 12 is arranged on the array substrate for realizing the function of touch on the LCD panel.

The touch electrode layer 12 is arranged on one side of the pixel electrode layer 11 facing a touch operational space 10. The touch operational space 10 is the space area where a user operates the function of touch. Thus, the touch electrode layer 12 approaches the touch operational space 10 closer, which accelerates to sense the use's act of touch and improves sensitivity of touch.

The array substrate further comprises a plurality of touch electrode lines 13 insulated against one another. The plurality of touch electrode lines 13 is disposed on a vertical projecting area of a black matrix on the array substrate on a color filter substrate of the touch panel. The arrangement of the plurality of touch electrode lines 13 is used for reducing the influence on the aperture ratio.

The touch electrode layer 12 comprises a plurality of self-capacitance touch electrodes 121 insulated against one another. The plurality of self-capacitance touch electrodes 121 are distributed in arrays. The area of each of the plurality of self-capacitance touch electrodes 121 ranges from 65 mm$^2$ to 70 mm$^2$, such as 66 mm$^2$ or 68 mm$^2$, or from 50 mm$^2$ to 75 mm$^2$. Each of the plurality of self-capacitance touch electrodes 121 is rectangular in this embodiment. The width of each of the plurality of self-capacitance touch electrodes 121 ranges from 5 mm to 8 mm or from 9 mm to 15 mm. It is possible that each of the plurality of self-capacitance touch electrodes 121 is circular or triangular or shaped as other shapes. Also, each of the plurality of self-capacitance touch electrodes 121 further comprises zigzag edges.

Each of the plurality of self-capacitance touch electrodes 121 is connected to one of the plurality of touch electrode lines 13 correspondingly. The plurality of touch electrode lines 13 are connected to a touch chip (not shown) for transmitting a touch signal sensed by each of the plurality of self-capacitance touch electrodes 121 to the touch chip. The principle of realizing the function of touch by the plurality of self-capacitance touch electrodes 121 is as follows: Each of the plurality of self-capacitance touch electrodes 121 senses a capacitor when a user touches the monitor. The capacitor is a constant value. When the user touches the monitor, such as a user's finger running functions on the monitor, the capacitor sensed by the self-capacitance touch electrode 121 changes with where the user's finger touches on the monitor. So, to detect the capacitors sensed by the self-capacitance touch electrode 121 is a good way for realizing the function of touch.

The touch electrode line 13 and a source-drain metallic layer of a thin-film transistor (TFT) for the pixel electrode layer 11 are not arranged on the same layer. The touch electrode line 13 is not arranged on the same layer with data lines for the pixel electrode layer 11, either. It is good for reducing the electrical impedance of the touch electrode line 13 since the touch electrode line 13 uses a metallic layer different from the source-drain metallic layer. Also, the touch electrode line 13 and the corresponding self-capacitance touch electrode 121 are arranged on different layers.

Specifically, a first insulation layer 14 and a second insulation layer 15 are formed on one side of the pixel electrode layer 11 facing the touch operational space 10 successively. The touch electrode layer 12 is formed on one side of the second insulation layer 15 facing the touch operational space 10. The plurality of touch electrode lines 13 are formed on one side of the first insulation layer 14 facing the touch operational space 10. The plurality of touch electrode lines 13 are disposed on a lower layer of the touch electrode layer 12 so that the plurality of touch electrode lines 13 and the corresponding self-capacitance touch electrodes 121 are disposed on different layers. A plurality of first conducting holes 151 are disposed on the second insulation layer 15. Some of the plurality of touch electrode lines 13 are connected to the corresponding self-capacitance touch electrodes 121 directly. The other of the plurality of touch electrode lines 13 are connected to the corresponding self-capacitance touch electrodes 121 via the first conducting hole 151, respectively.

A plurality of touch electrode lines 13 can be formed on one side of a first insulation layer 14 backing on a touch operational space 10, that is, the plurality of touch electrode lines 13 and a pixel electrode layer 11 are arranged on the same layer in other embodiments. A conducting hole can be arranged on a first insulation layer 14 and a second insulation layer 15. The plurality of touch electrode lines 13 are connected to the corresponding self-capacitance touch electrodes 121 via the conducting hole arranged on the first insulation layer 14 and the second insulation layer 15. Moreover, it is also possible that only the first insulation layer 14 or only the second insulation layer 15 is arranged on an area between the pixel electrode layer 11 and the touch electrode layer 12.

Please continue to refer to FIG. 1 and FIG. 2. The touch electrode layer 12 is also used as a common electrode layer of the array substrate in this embodiment. Necessary common electrode signals pass through the plurality of touch electrode lines 13 at the stage of display so that each of the plurality of self-capacitance touch electrodes 121 has a common electrode signal for display. The plurality of touch electrode lines 13 are used as touch leads connected to the touch chip at the stage of touch and scan for transmitting a sensing signal from each of the plurality of self-capacitance touch electrodes 121 to the touch chip for realizing the function of touch.

The touch electrode layer 12 can be fabricated from indium tin oxide (ITO) or grapheme.

Furthermore, the array substrate in this embodiment further comprises a third insulation layer 16, a source-drain metallic layer 17, a fourth insulation layer 18, a gate 19, a gate insulation layer 20, and an active layer 21. The third insulation layer 16, the source-drain metallic layer 17, the fourth insulation layer 18, the gate 19, the gate insulation layer 20, and the active layer 21 are formed on one side of the pixel electrode layer 11 backing on the touch operational space 10 successively. The array substrate further comprises a substrate 22. The substrate 22 is used for bearing the above-mentioned components such as the pixel electrode layer 11, the active layer 21, and the gate insulation layer 20. The source-drain metallic layer 17 comprises a drain 171 and a source 172. The drain 171 and the source 172 touch the active layer 21, respectively. The gate 19, the drain 171, and the source 172 are a gate, a drain, and a source of the TFT driving the pixel electrode layer 11, respectively.

The third insulation layer 16 is used for separating the pixel electrode layer 11 from the source-drain metallic layer 17. A second conducting hole 161 is arranged on the third insulation layer 16. The pixel electrode layer 11 is connected to the drain 171 in the source-drain metallic layer 17 via the second conducting hole 161.

The self-capacitance touch electrode 121 in this embodiment is used for realizing the function of touch. The touch electrode line 13 is used as a sensing line without any driving lines disposed on the panel. Such an arrangement is good for not broadening the width of borders of the panel, reducing the circuit in the panel, decreasing the parasitic capacitance, and lessening the influence of the circuit on the aperture ratio of the panel. In addition, by arranging the touch electrode layer 12 on one side of the pixel electrode layer 11 facing the touch operational space 10, sensitivity of touch improves.

Figure 3:
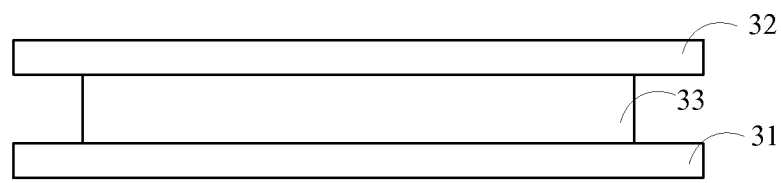
FIG. 3 is a schematic diagram of a touch panel according to a preferred embodiment of the present invention.

Please refer to FIG. 3. A touch panel is an LCD display panel with the function of touch in one embodiment of the present invention. The touch panel comprises an array substrate 31, a color filter substrate 32, and a liquid crystal layer 33 sandwiched in an area between the array substrate 31 and the color filter substrate 32. The array substrate 31 is any kind of array substrate introduced in the previous embodiments.

The touch panel can also be an organic light-emitting diode (OLED) display panel with the function of touch or other kinds of display panels with the function of touch in other embodiments.

Figure 4:
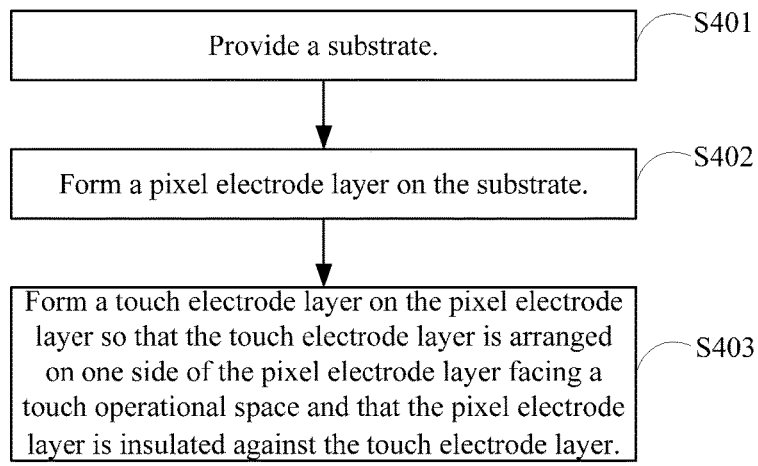
FIG. 4 is a flowchart of a method of fabricating an array substrate according to a preferred embodiment of the present invention.

Please refer to FIG. 4. FIG. 4 is a method for fabricating an array substrate according to one embodiment of the present invention. The method is used for fabricating the array substrate proposed by the embodiment as shown in FIG. 1. The method comprises steps of:

Step S401: Provide a substrate.

Step S402: Form a pixel electrode layer on the substrate.

Step S403: Form a touch electrode layer on the pixel electrode layer so that the touch electrode layer is arranged on one side of the pixel electrode layer facing a touch operational space and that the pixel electrode layer is insulated against the touch electrode layer.

The touch electrode layer is arranged on one side of the pixel electrode layer facing the touch operational space. Thus, the touch electrode layer approaches to the touch operational space closer, which accelerates to sense the use's act of touch and improves sensitivity of touch.

Figure 5:
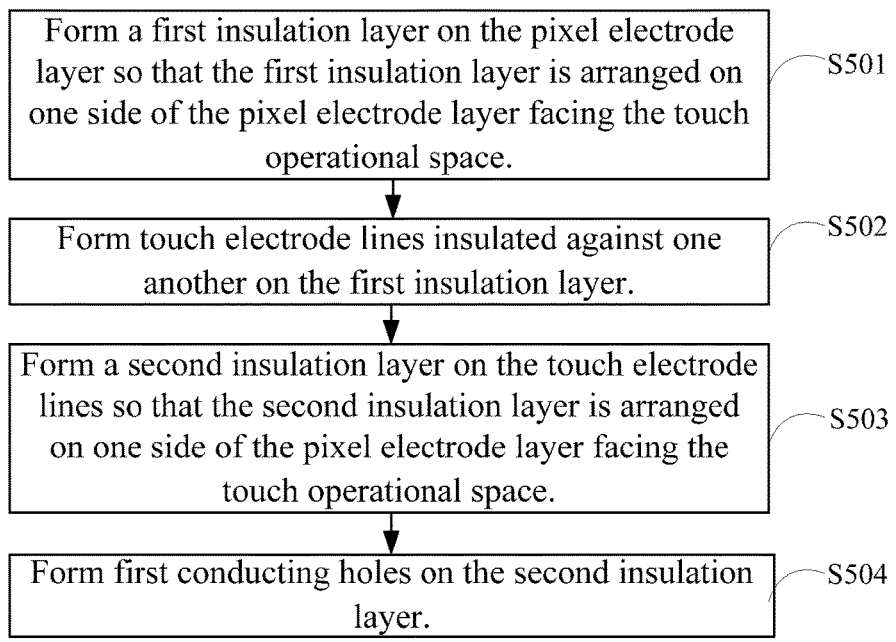
FIG. 5 is a flowchart of steps before forming a touch electrode layer on a pixel electrode layer illustrated in a method of fabricating an array substrate according to a preferred embodiment of the present invention.

Please refer to FIG. 5. Further, before the step of forming the touch electrode layer on the pixel electrode layer, some steps are needed as follows:

Step S501: Form a first insulation layer on the pixel electrode layer so that the first insulation layer is arranged on one side of the pixel electrode layer facing the touch operational space.

Step S502: Form a plurality of touch electrode lines insulated against one another on the first insulation layer.

Step S503: Form a second insulation layer on the plurality of touch electrode lines so that the second insulation layer is arranged on one side of the pixel electrode layer facing the touch operational space.

Step S504: Form a plurality of first conducting holes on the second insulation layer.

Steps of forming the touch electrode layer on the pixel electrode layer comprise: Forming a plurality of self-capacitance touch electrodes insulated against one another on the second insulation layer and connecting each of the plurality of self-capacitance touch electrodes to one corresponding touch electrode line. The pixel electrode layer is separated from the touch electrode layer by the first insulation layer and the second insulation layer so that the pixel electrode layer and the touch electrode layer are insulated successfully. Besides, the touch electrode layer is formed on the first insulation layer, and the plurality of self-capacitance touch electrodes are formed on the second insulation layer so that the touch electrode layer and the plurality of self-capacitance touch electrodes are arranged on different layers.

At least some of the plurality of touch electrode lines are connected to the corresponding self-capacitance touch electrodes via the first conducting hole, respectively. The other of the plurality of touch electrode lines are connected to the plurality of self-capacitance touch electrodes directly.

It is also possible that only a first insulation layer or only a second insulation layer is arranged on an area between a pixel electrode layer and a touch electrode layer in other embodiments. It is also possible that a touch electrode line and the pixel electrode layer are arranged on the same layer.

In addition, before the step of forming the pixel electrode layer on the substrate, some steps are needed as follows: Forming an active layer, a gate insulation layer, a gate, a fourth insulation layer, a source-drain metallic layer, and a third insulation layer on the substrate successively where the pixel electrode layer is formed on the third insulation layer so that the active layer, the gate insulation layer, the gate, the fourth insulation layer, the source-drain metallic layer, and the third insulation layer are all arranged on one side of the pixel electrode layer backing up the touch operational space.

A second conducting hole is formed on the third insulation layer. The pixel electrode layer is connected to the source-drain metallic layer via the second conducting hole. Further, the source-drain metallic layer comprises a source and a drain. The source and the drain are connected to the active layer, respectively. The pixel electrode layer is connected to the drain via the second conducting hole. The formed gate, the formed source, and the formed drain are used as a gate, a source, and a drain of the TFT driving the pixel electrode layer, respectively for realizing the driving of the pixel electrode layer.

The touch electrode line is separated from the source-drain metallic layer by the first insulation layer, the pixel electrode layer, and the third insulation layer, etc. so that the touch electrode line and the source-drain metallic layer are not arranged on the same layer. It helps reduce the electrical impedance of the touch electrode line.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An array substrate applied to a touch panel, comprising a plurality of touch electrode lines insulated against one another, a pixel electrode layer, and a touch electrode layer insulated against the pixel electrode layer, and the touch electrode layer is arranged on one side of the pixel electrode layer facing a touch operational space;

wherein the touch electrode layer comprises a plurality of self-capacitance touch electrodes insulated against one another, each of the plurality of self-capacitance touch electrodes is connected to one of the plurality of touch electrode lines correspondingly, and the one of the plurality of touch electrode lines and a source-drain metallic layer driving a thin-film transistor (TFT) of the pixel electrode layer are not arranged on the same layer;

the touch electrode layer used as a common electrode layer of the array substrate as well, wherein the array substrate further comprises:
a substrate;
an active layer, disposed on the substrate;
a gate insulation layer, disposed on the active layer and the substrate;
a gate, disposed on the gate insulation layer;
a fourth insulation layer, disposed on the gate insulation layer and the gate;
a third insulation layer, disposed on the fourth insulation layer;
wherein the third insulation layer, the source-drain metallic layer, the fourth insulation layer, the gate, the gate insulation layer, and the active layer are formed on one side of the pixel electrode layer backing on the touch operational space successively,
wherein a second conducting hole is arranged on the third insulation layer, and the pixel electrode layer is connected to the source-drain metallic layer via the second conducting hole,
wherein the source-drain metallic layer comprises a source and a drain, both the source and the drain penetrate the gate insulation layer and the fourth insulation layer, and contact the active layer;
wherein a first insulation layer and a second insulation layer are formed on one side of the pixel electrode layer facing the touch operational space successively, and the touch electrode layer is arranged on one side of the second insulation layer facing the touch operational space;
the plurality of touch electrode lines are formed on one side of the first insulation layer facing the touch operational space, a plurality of first conducting holes are disposed in the second insulation layer, and some of the plurality of touch electrode lines are connected to some of the plurality of self-capacitance touch electrodes correspondingly via the first conducting holes respectively, while others of the plurality of touch electrode lines are respectively connected to others of the plurality of self-capacitance touch electrodes directly.

2. The array substrate of claim 1, wherein each of the plurality of touch electrode lines and each of the plurality of self-capacitance touch electrodes correspondingly are arranged on different layers.

3. A touch panel, comprising an array substrate, the array substrate comprising a pixel electrode layer and a touch electrode layer insulated against the pixel electrode layer, wherein the touch electrode layer is arranged on one side of the pixel electrode layer facing a touch operational space,
wherein the array substrate further comprises:
a substrate;
an active layer, disposed on the substrate;
a gate insulation layer, disposed on the active layer and the substrate;
a gate, disposed on the gate insulation layer;
a fourth insulation layer, disposed on the gate insulation layer and the gate;
a source-drain metallic layer;
a third insulation layer, disposed on the fourth insulation layer;
wherein the third insulation layer, the source-drain metallic layer, the fourth insulation layer, the gate, the gate insulation layer, and the active layer are formed on one side of the pixel electrode layer backing on the touch operational space successively, wherein a second conducting hole is arranged on the third insulation layer, and the pixel electrode layer is connected to the source-drain metallic layer via the second conducting hole, wherein the source-drain metallic layer comprises a source and a drain, both the source and the drain penetrate the gate insulation layer and the fourth insulation layer, and contact the active layer;

wherein the array substrate further comprising a plurality of touch electrode lines insulated against one another, wherein the touch electrode layer comprise a plurality of self-capacitance touch electrodes insulated against one another, each of the plurality of self-capacitance touch electrodes is connected to one of the plurality of touch electrode lines correspondingly, and the one of the plurality of touch electrode lines and a source-drain metallic layer driving a thin-film transistor (TFT) of the pixel electrode layer are not arranged on the same layer;

wherein a first insulation layer and a second insulation layer are formed on one side of the pixel electrode layer facing the touch operational space successively, and the touch electrode layer is arranged on one side of the second insulation layer facing the touch operational space;

the plurality of touch electrode lines are formed on one side of the first insulation layer facing the touch operational space, a plurality of first conducting holes are disposed on the second insulation layer, and some of the plurality of touch electrode lines are connected to some of the plurality of self-capacitance touch electrodes correspondingly via the first conducting hole respectively, while others of the plurality of touch electrode lines are respectively connected to others of the plurality of self-capacitance touch electrodes directly.

4. The touch panel of claim 3, wherein each of the plurality of touch electrode lines and each of the plurality of self-capacitance touch electrodes correspondingly are arranged on different layers.

5. The touch panel of claim 3, wherein the touch electrode layer is used as a common electrode layer of the array substrate as well.

* * * * *